(12) United States Patent
Figueroa (10) Patent No.: US 7,360,070 B1
(45) Date of Patent: Apr. 15, 2008

(54) SPECIALIZED PROCESSING UPON AN OCCURRENCE OF AN EXCEPTIONAL SITUATION DURING THE COURSE OF A COMPUTATION

(75) Inventor: Samuel A. Figueroa, Fremont, CA (US)

(73) Assignee: Apple Inc., Cupertino, CA (US)

( * ) Notice: Subject to any disclaimer, the term of this patent is extended or adjusted under 35 U.S.C. 154(b) by 437 days.

(21) Appl. No.: 10/641,215

(22) Filed: Aug. 13, 2003

(51) Int. Cl.
*G06F 7/38* (2006.01)
*G06F 9/00* (2006.01)
*G06F 9/44* (2006.01)
*G06F 15/00* (2006.01)

(52) U.S. Cl. ................................. 712/244
(58) Field of Classification Search ............... 712/218, 712/244
See application file for complete search history.

(56) References Cited

U.S. PATENT DOCUMENTS

| 5,481,685 A | * | 1/1996 | Nguyen et al. | 712/244 |
| 5,502,827 A | * | 3/1996 | Yoshida | 712/244 |
| 6,216,222 B1 | * | 4/2001 | Hinds et al. | 712/244 |
| 6,289,446 B1 | * | 9/2001 | Nilsson | 712/244 |

OTHER PUBLICATIONS

Figueroa, Samuel A., "A Rigorous Framework for Fully Supporting the IEEE Standard for Floating-Point Arithmetic in High-Level Programming Languages," Jan. 2000, Dissertation for Degree of Doctor of Philosophy, Department of Computer Science, NY University.

Kahan, W., "Lecture Notes on the Status of IEEE Standard 754 for Binary Floating-Point Arithmetic," Oct. 1, 1997, Lecture Notes for Dept. Elect. Eng. & Computer Science, University of California, Berkeley, CA.

"IEEE Standard for Binary Floating-Point Arithmetic," Mar. 21, 1985, ANSI/IEEE Std 754-1985, The Institute of Electrical and Electronics Engineers, Inc., New York, NY.

* cited by examiner

*Primary Examiner*—Richard L. Ellis
*Assistant Examiner*—Brian P Johnson
(74) *Attorney, Agent, or Firm*—Fenwick & West LLP (57) ABSTRACT

An exceptional situation manager associates exceptional situations with nonstandard values and desired responses to perform when specific exceptional situations occur during computations. A desired response can comprise returning an associated nonstandard value, performing an associated nonstandard action or returning a default value. The exceptional situation manager ascertains the occurrence of exceptional situations during computations. Responsive to such an occurrence, the exceptional situation manager determines the desired response associated with the exceptional situation that occurred, and executes the desired response.

19 Claims, 6 Drawing Sheets

SPECIALIZED PROCESSING UPON AN OCCURRENCE OF AN EXCEPTIONAL SITUATION DURING THE COURSE OF A COMPUTATION

BACKGROUND

1. Field of Invention

The present invention relates generally to exception handling, and specifically to providing a nonstandard desired response to the occurrence of an exceptional situation during a computation.

2. Background of Invention

When a computation is performed on a computing system, typically a result or return value can be generated. For example, in the case of a divide operation, the result will be the quotient. Exceptional situations can occur during the course of a computation. For example, an attempt can be made to divide by zero during a divide operation, the result of which is undefined in mathematics. Many computing systems are configured to produce certain default results when an exceptional situation arises during the course of a computation. For example, on a floating-point arithmetic engine that conforms to the Institute of Electrical and Electronics Engineers (IEEE) Standard for Binary Floating-Point Arithmetic, when both the dividend and the divisor of a divide operation are zero, the default quotient produced is a special value called NaN, which stands for Not a Number.

Under some circumstances, the default result for an exceptional situation that arises during the course of a computation can be appropriate. However, in some cases the default result produced when an exceptional situation arises is not appropriate for the computation being performed. Consider, for example, computing the value of (sin x)/x. As x approaches zero, the mathematical value of this equation approaches one, not some special value such as NaN.

It would be desirable to be able to specify a nonstandard value to be returned, should a specific exceptional situation arise during the course of a computation. Because desired results can be a function of dynamic circumstances such as the application or operating environment in which the computation is occurring, it would be further desirable to be able to specify and dynamically change the return values for computations during which specific exceptional situations occur. It will sometimes be desirable to use the default value, so selection thereof should be possible. What is needed are systems and methods to dynamically specify and modify results to be produced when specific exceptional situations occur during the course of computations.

SUMMARY OF INVENTION

An exceptional situation manager associates exceptional situations with nonstandard values and desired responses to perform when specific exceptional situations occur during computations. In some instances the desired response to the occurrence of an exceptional situation during a computation is to return the associated nonstandard value as the result of the computation. In other instances, the desired response can be to perform a nonstandard action, such as the generation of a control signal associated with the specific exceptional situation that occurred. In still other instances, it can be desirable to return a default value as the result of the computation. The exceptional situation manager can dynamically update both nonstandard values and desired responses associated with exceptional situations.

The exceptional situation manager ascertains the occurrence of exceptional situations during computations. Responsive to such an occurrence, the exceptional situation manager determines the desired response associated with the exceptional situation that occurred. The exceptional situation manager proceeds to execute the desired response. As explained above, the desired response can comprise returning a nonstandard value associated with the specific exceptional situation. Where this is the case, the exceptional situation manager retrieves the associated nonstandard value, and returns it as the result of the computation during which the exceptional situation occurred.

The present invention has many possible commercial applications. For example, the present invention could be incorporated into the floating point unit of a programmable microprocessor. The present invention could be utilized in that context to execute a desired action (e.g., return default results, return nonstandard values) when various exceptional situations (e.g., an overflow, a divide by zero) occur during computations. Because various exceptional situations can occur under a wide variety of circumstances, it is useful to be able to customize the response as desired.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

Figure 1:
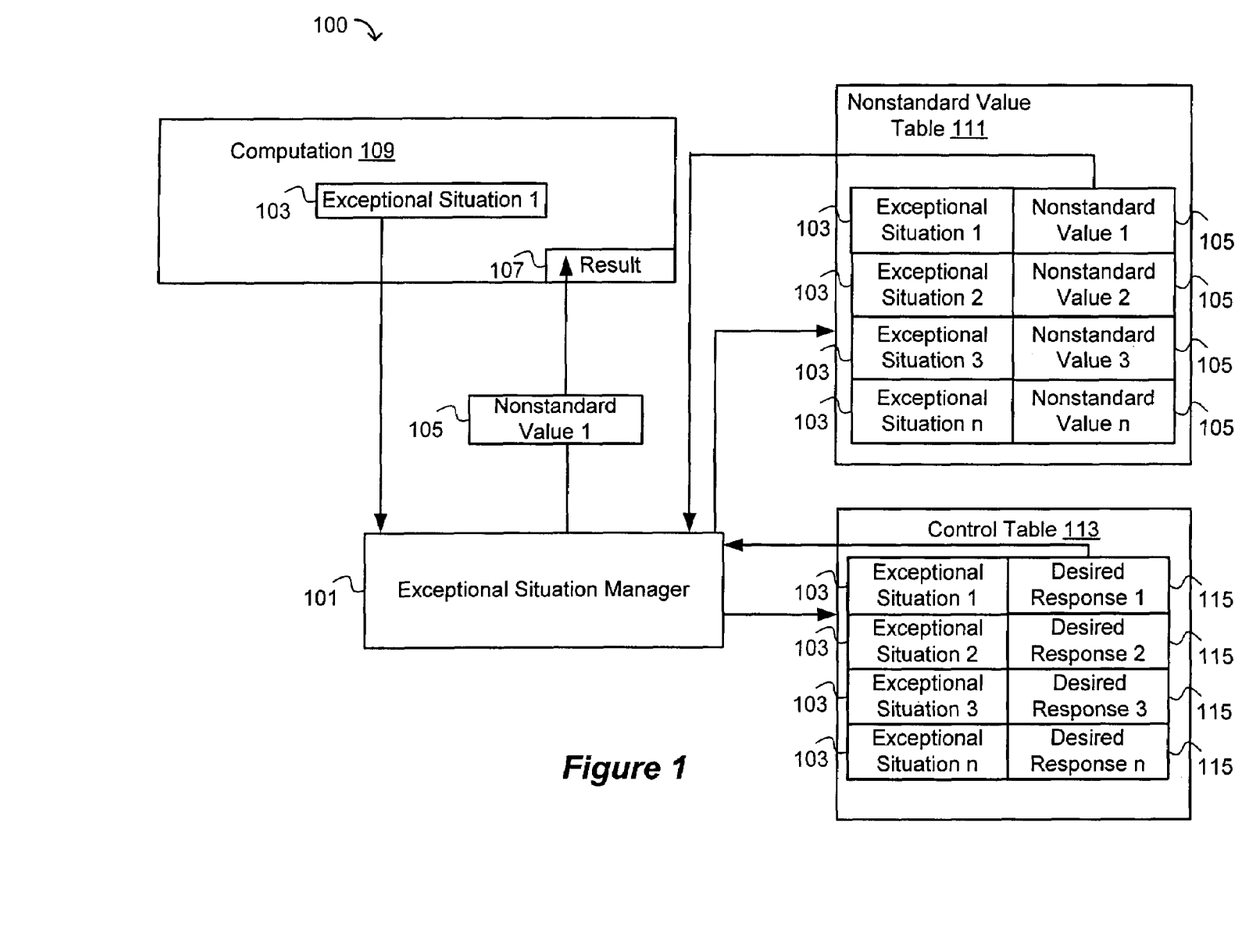
FIG. 1 is a block diagram illustrating a high level overview of a system for performing some embodiments of the present invention.

FIG. 1 illustrates a high level overview of a system 100 for performing some embodiments of the present invention. An exceptional situation manager 101 associates exceptional situations 103 with nonstandard values 105. A nonstandard value 105 can be returned as the result 107 of a computation 109 during which its associated exceptional situation 103 occurs. Although FIG. 1 illustrates four exceptional situations 103 and four associated nonstandard values 105, these numbers are of course only examples. More or fewer exceptional situations 103 and associated nonstandard values 105 can be utilized, as desired.

FIG. 1 illustrates the exceptional situation manager 101 associating specific exceptional situations 103 with nonstandard values 105 by writing entries to a nonstandard value table 111. It is to be understood that in other embodiments, the exceptional situation manager 101 associates specific exceptional situations 103 with nonstandard values 105 in other ways. For example, the exceptional situation manager 101 can write the nonstandard value 105 (or a pointer or reference thereto) to a storage area associated with the exceptional situation 103 other than a nonstandard value table 111 entry. Examples include an address in random access memory associated with the exceptional situation 103 (e.g., a defined program variable), a processor register associated with the exceptional situation 103, or a location on static media (e.g., magnetic or optical media). In other embodiments, nonstandard values 105 can be associated with exceptional situations 103 by storing the nonstandard values 105 or pointers thereto in appropriate entries in a control table 113, as discussed in greater detail below. In other embodiments, nonstandard values 105 can be associated with exceptional situations 103 in ways other than through the use of storage areas. Of course, the exceptional situation manager 101 can update nonstandard values 105 associated with exceptional situations (e.g., by updating the value stored in the appropriate entry of the nonstandard value table 111, or other associated storage area).

The exceptional situation manager 101 also associates exceptional situations 103 with a desired response 115 to perform when the exceptional situation 103 occurs during a computation 109. The desired response 115 can comprise returning the nonstandard value 105 associated with the exceptional situation 103 as the result 107 of the computation 109. However, other desired responses 115 are possible as well. The desired response can comprise performing some nonstandard action other than returning the nonstandard value 105, e.g., generating a control signal or terminating a process. Additionally, the desired response 115 can comprise returning the default value as the result 107 of the computation 109.

FIG. 1 illustrates the exceptional situation manager 101 associating specific exceptional situations 103 with desired responses 115 by writing entries to a control table 113. As described above, in some embodiments, nonstandard values 105 can also be associated with exceptional situations 103 via the control table 113. In such embodiments, the exceptional situation manager 101 stores the nonstandard values 105 or pointers thereto in the appropriate entries in the control table 113, along with the associated desired responses 115.

It is to be understood that in other embodiments, the exceptional situation manager 101 associates specific exceptional situations 103 with desired responses 115 in other ways. For example, the exceptional situation manager 101 can store a directive indicating an action to perform in response to the occurrence of a specific exceptional situation 103 in a storage area associated with the exceptional situation 103 other than a control table 113 entry. Examples include an address in random access memory associated with the exceptional situation 103 (e.g., a defined program variable), a processor register associated with the exceptional situation 103, or a location on static media (e.g., magnetic or optical media). In other embodiments, desired responses 115 can be associated with exceptional situations 103 in ways other than through the use of storage areas. As with nonstandard values 105, the exceptional situation manager 101 can update desired responses 115 associated with exceptional situations 103 as desired.

As illustrated in FIG. 1, the exceptional situation manager 101 ascertains occurrences of specific exceptional situations 103 during computations 109. The implementation mechanics for ascertaining occurrences of exceptional situations 103 are known to those of ordinary skill in the relevant art. The exceptional situation manager 101 determines the desired response 115 to the occurrence of an exceptional situation 103. As described above, a desired response can comprise returning an associated nonstandard value 105 as the result 107 of the computation 109, returning the default value, or performing a nonstandard action. The exceptional situation manager 101 can determine the desired response 115 by retrieving it from the storage area associated with the exceptional situation (e.g., the control table 113, address, register, etc.). Once the exceptional situation manager 101 has determined the desired response 115 to the occurrence of the exceptional situation 103, the exceptional situation manager 101 executes the response (e.g., returns the nonstandard 105 or default value as the result of the computation, or performs the nonstandard action associated with the exceptional situation 103).

It is to be understood that although the exceptional situation manager 101 is illustrated as a single entity, as the term is used herein an exceptional situation manager 101 refers to a collection of functionalities which can be implemented as hardware, firmware, software or any combination of the three. Where an exceptional situation manager 101 is implemented as software, it can be implemented as a standalone program, but can also be implemented in other ways, for example as part of a larger program, as a plurality of separate programs, or as one or more statically or dynamically linked libraries.

Figure 2:
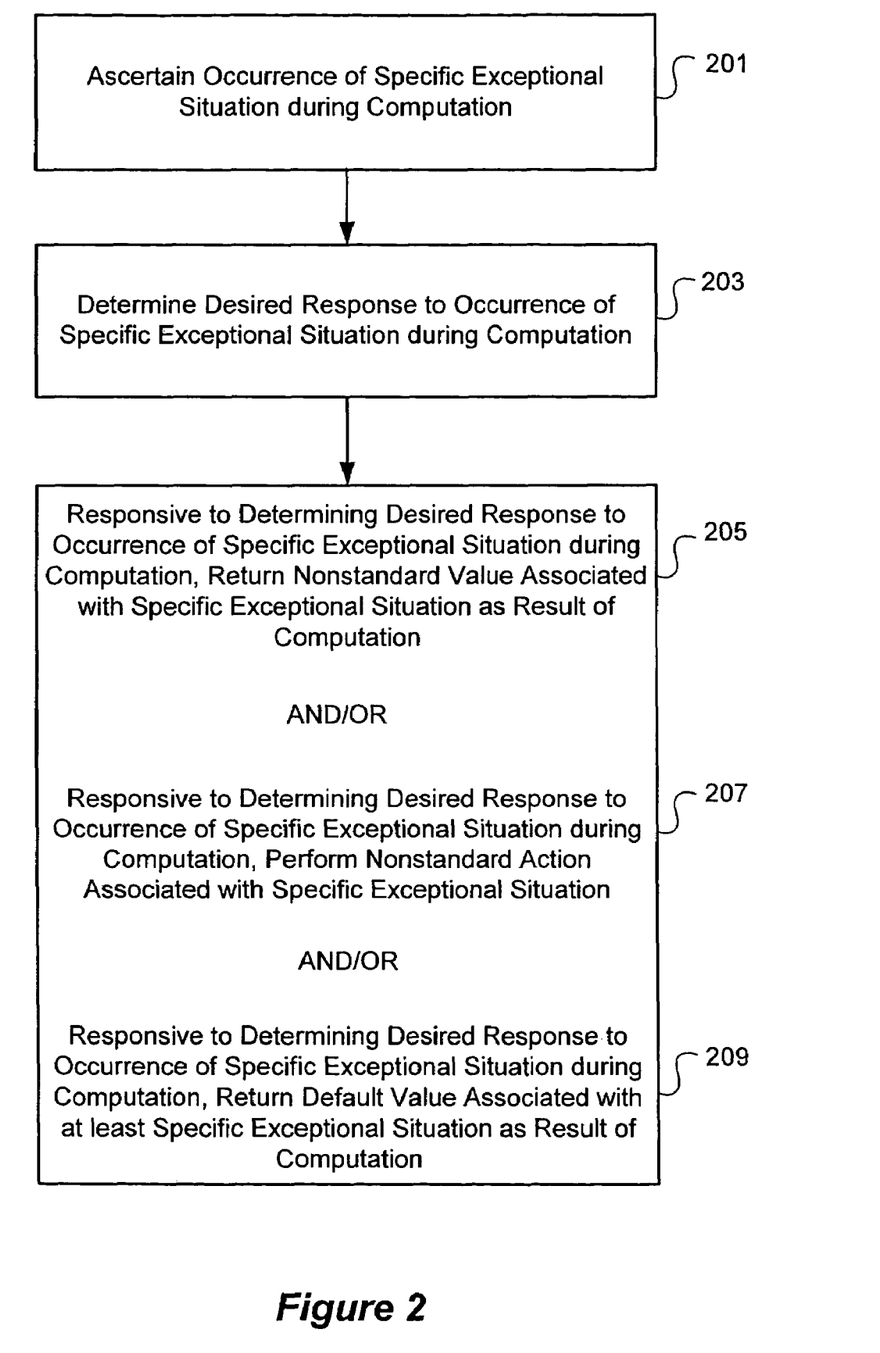
FIG. 2 is a flowchart illustrating steps for an exceptional situation manager to process the occurrence of exceptional situations during computations, according to some embodiments of the present invention.

FIG. 2 illustrates steps for the exceptional situation manager 101 to process the occurrence of exceptional situations 103 during computations 109, according to some embodiments of the present invention. The exceptional situation manager 101 ascertains 201 an occurrence of a specific exceptional situation 103 during a computation 109. The exceptional situation manager 101 proceeds to determine 203 a desired response 115 to the occurrence of the specific exceptional situation 103, and execute that desired response 115. In some instances, the exceptional situation manager 101 returns 205 a nonstandard value 105 associated with the specific exceptional situation 103 as a result 107 of the computation 109. In other instances, the exceptional situation manager 101 performs 207 a nonstandard action associated with the specific exceptional situation 103. In other instances, the exceptional situation manager 101 returns 209 a default value associated with the specific exceptional situation 103 as a result of the computation 109.

Figure 3:
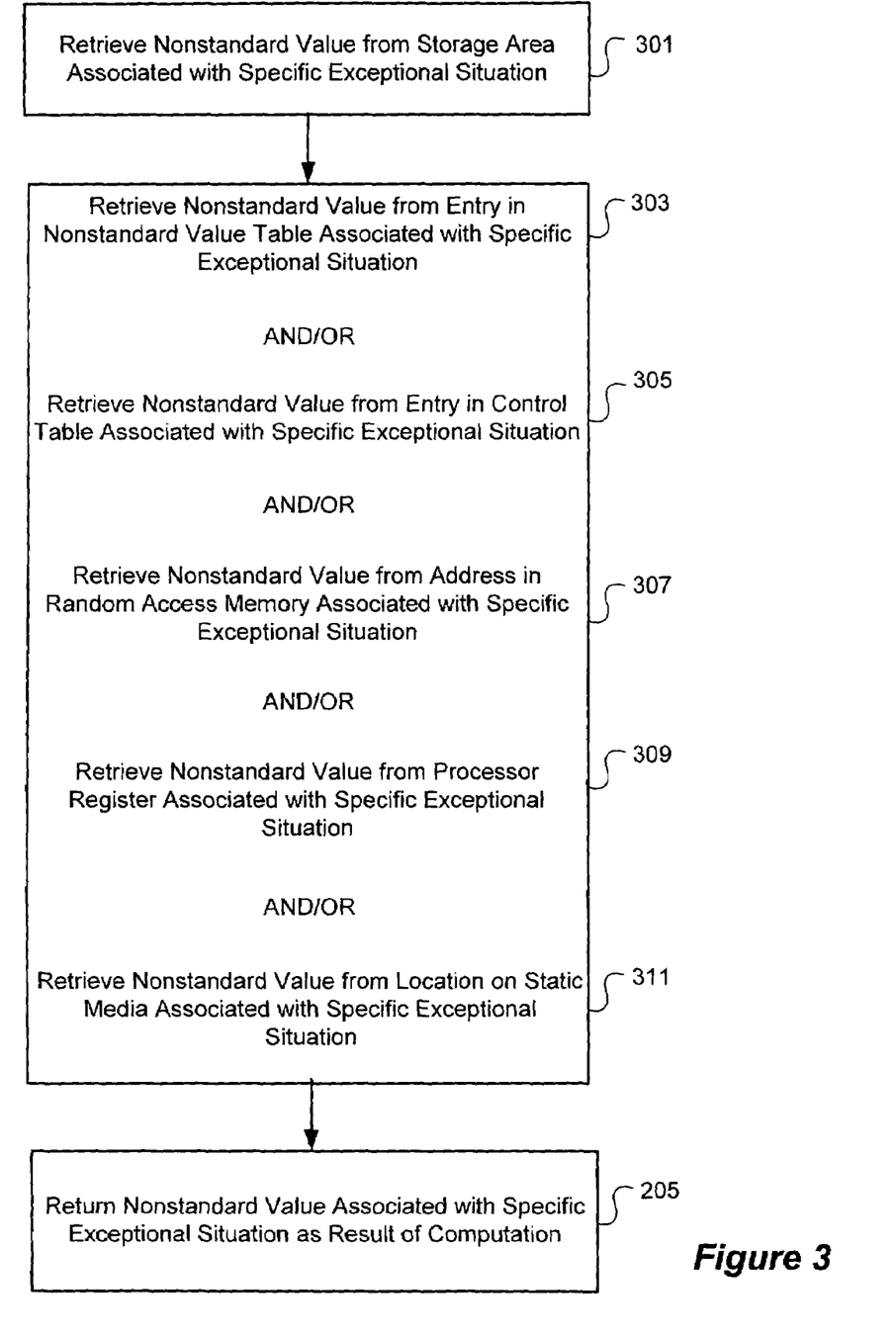
FIG. 3 is a flowchart illustrating steps for processing the occurrence of an exceptional situation during a computation, according to some embodiments of the present invention in which the desired response to a specific exceptional situation is to return an associated nonstandard value.

FIG. 3 illustrates further steps for processing the occurrence of an exceptional situation 103 during a computation 109, according to some embodiments of the present invention in which the desired response 115 to a specific exceptional situation 103 is to return an associated nonstandard value 105. The exceptional situation manager 101 retrieves 301 a nonstandard value 105 from a storage area associated with the specific exceptional situation 103 that occurred. In various embodiments, this can comprise retrieving 303-311 the nonstandard value from an associated entry in a nonstandard value table 111, an entry in a control table 113, an address in random access memory, a location on static media or a processor register. Regardless of the location from which the nonstandard value 105 is retrieved, the exceptional situation manager 101 returns 205 the nonstandard value 105 as the result 107 of the computation 109.

Figure 4:
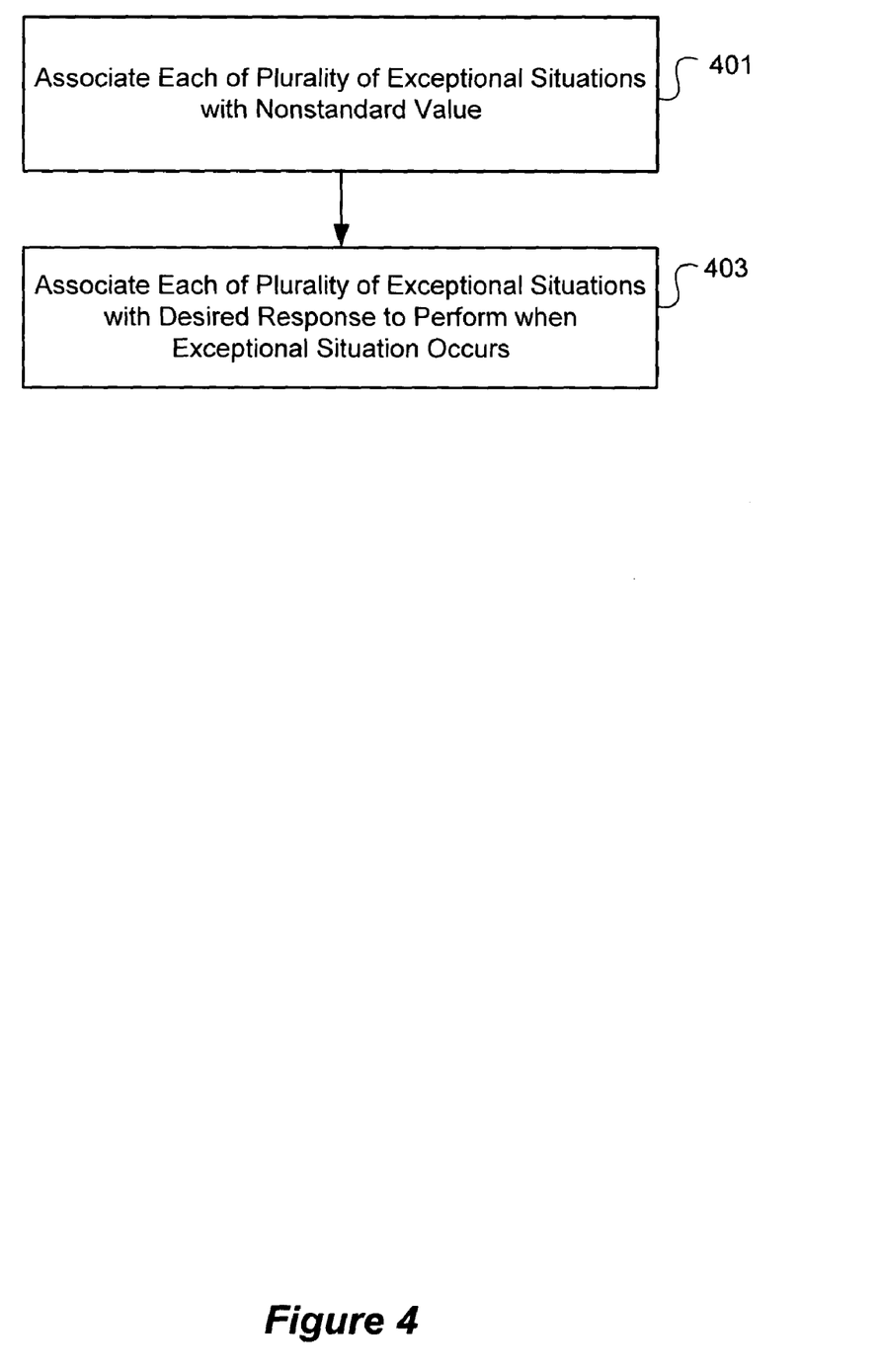
FIG. 4 is a flowchart illustrating steps for associating exceptional situations with nonstandard values and desired responses, according to some embodiments of the present invention.

FIG. 4 illustrates steps for associating exceptional situations 103 with nonstandard values 105 and desired responses 115, according to some embodiments of the present invention. The exceptional situation manager 101 associates 401 exceptional situations 103 with nonstandard values 105. Possible variations on this step are explained further below in the discussion of FIG. 5. The exceptional situation manager 101 also associates 401 exceptional situations 103 with desired responses for when the exceptional situation 103 occurs during a computation 109. As explained above, a desired response 115 can comprise returning 205 the nonstandard value as the result 107 of the computation 109, performing 207 a nonstandard action associated with the specific exceptional situation 103 or returning a default value as the result 107 of the computation 109.

Figure 5:
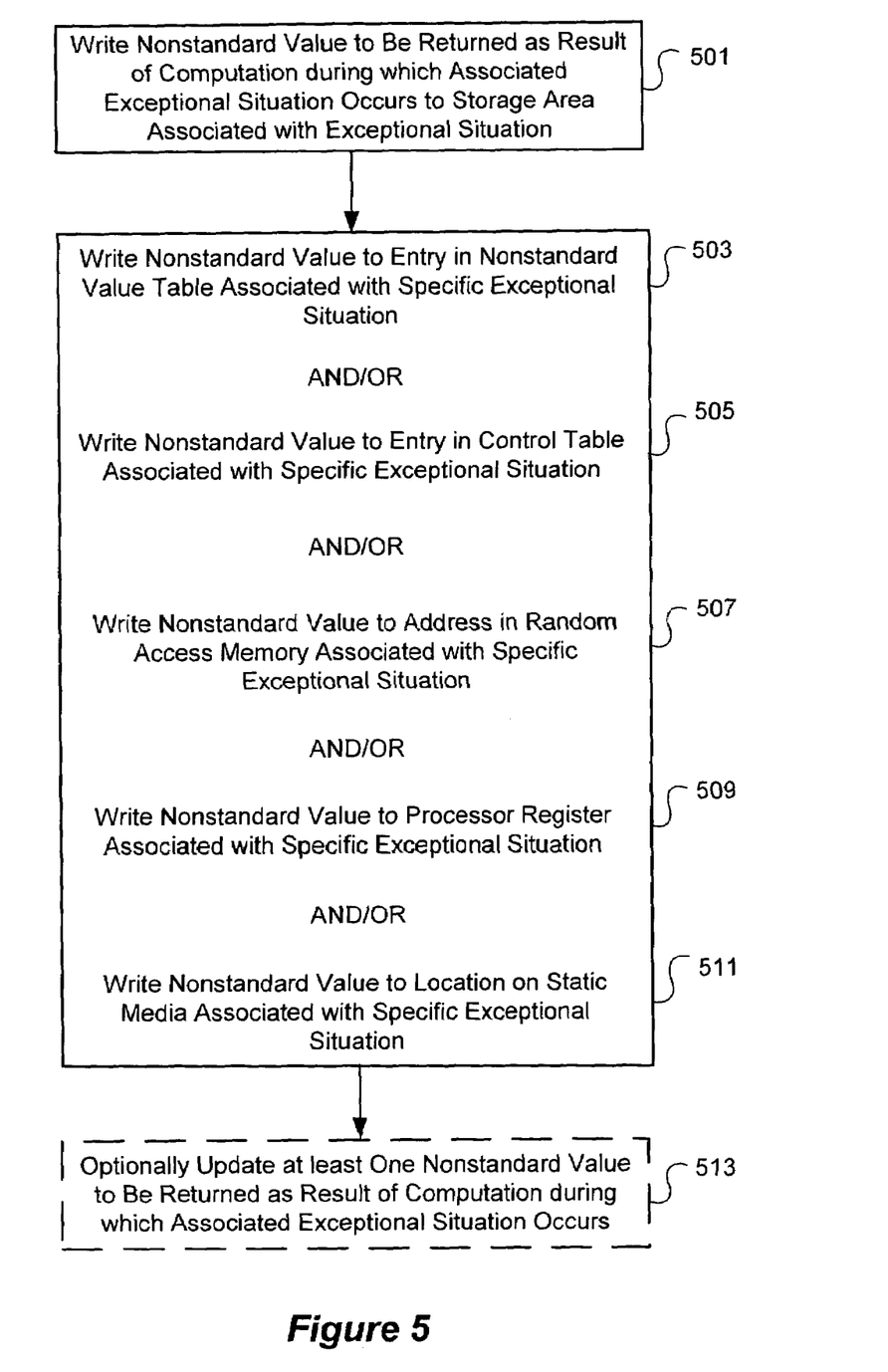
FIG. 5 is a flowchart illustrating steps for associating nonstandard values with specific exceptional situations according to some embodiments of the present invention.

FIG. 5 illustrates steps for associating nonstandard values 105 with specific exceptional situations 103 according to some embodiments of the present invention. As explained above, in some embodiments the exceptional situation manager 101 associates 401 a nonstandard value 105 with an exceptional situation 103 by writing 501 the nonstandard value 105 to a storage area associated with the exceptional situation 103. In various embodiments this can take the form of writing 503-511 the nonstandard value 105 to an associated entry in a nonstandard value table 111, an entry in a control table 113, an address in random access memory, a location on static media or a processor register. Additionally, in some instances the exceptional situation manager 101 updates 513 at least one nonstandard value 105 to be returned as a result 107 of a computation 109 during which an associated exceptional situation 103 occurs.

Figure 6:
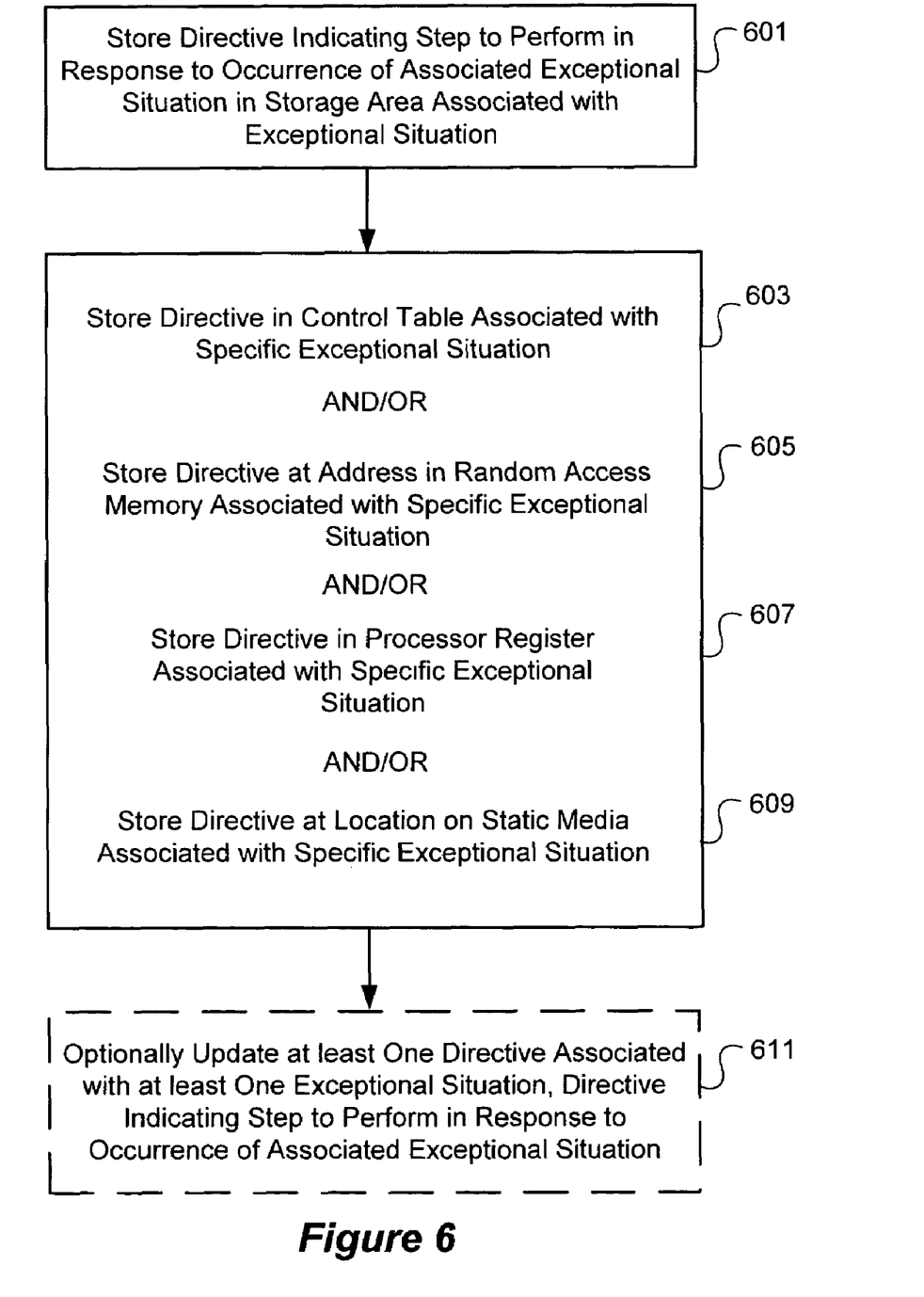
FIG. 6 is a flowchart illustrating steps for storing directives indicating desired responses to occurrences of exceptional situations, according to some embodiments of the present invention.

FIG. 6 illustrates steps for storing directives indicating desired responses to occurrences of exceptional situations 103, according to some embodiments of the present invention. The exceptional situation manager 101 stores 601 a directive indicating a step to perform in response to the occurrence of an associated exceptional situation 103 in a storage area associated with the exceptional situation 103. In various embodiments this can take the form of storing 603-609 the directive in an entry in a control table 113, at an address in random access memory, in a processor register or at a location on static media. As desired, the exceptional situation manager 101 can update 611 a directive indicating a step to perform in response to the occurrence of an associated exceptional situation 103.

It is to be understood that the contents of a specific nonstandard value 105 is a variable design choice. In some embodiments, the contents of a nonstandard value 105 to return when its associated exceptional situation 103 occurs can be a function of the specific associated exceptional situation 103 (e.g., an identifier thereof). In other embodiments, the contents of a nonstandard value 105 can be a function of what the result 107 of the computation 109 would have been, but for the occurrence of the exceptional situation 103. For example, consider computing the value of (sin x)/x. As discussed above, as x approaches zero, the mathematical value of this equation approaches one. Where x approaches zero from 1, the result 107 approaches 1, whereas where x approaches zero from −1, the result 107 approaches −1. With this and other exceptional situations 103, it could be desirable to map the sign of the nonstandard value 105 to the sign of what the result 107 of the computation 109 would have been, had the exceptional situation 105 not occurred. In other embodiments, the contents of nonstandard values 105 can be determined in various other ways, as desired. Other examples will be apparent to those of ordinary skill in the relevant art in light of this specification.

As will be understood by those familiar with the art, the invention may be embodied in other specific forms without departing from the spirit or essential characteristics thereof. Likewise, the particular naming and division of the modules, features, attributes, methodologies and other aspects are not mandatory or significant, and the mechanisms that implement the invention or its features may have different names, divisions and/or formats. Furthermore, as will be apparent to one of ordinary skill in the relevant art, the modules, features, attributes, methodologies and other aspects of the invention can be implemented as hardware, firmware, software or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for processing occurrences of exceptional situations during computations, the method comprising:

ascertaining an occurrence of a specific exceptional situation during a computation, the specific exceptional situation comprising a specific instance of a general exceptional situation;

determining a desired response to the occurrence of the specific exceptional situation, the desired response comprising:

returning, as a result of the computation, a nonstandard value associated with the specific exceptional situation, wherein a default value would be returned for the general exceptional situation, the nonstandard value residing in a nonstandard value table comprising a plurality of specific exceptional situations and corresponding nonstandard values; and dynamically updating the nonstandard value in the nonstandard value table and the desired response associated with the nonstandard value as a result of the computation during which the specific exceptional situation occurred.

2. A computer implemented method for processing occurrences of exceptional situations during computations, the method comprising:

associating each of a plurality of specific exceptional situations with a nonstandard value, each of the plurality of specific exceptional situations comprising specific instances of corresponding general exceptional situations;

associating each of the plurality of specific exceptional situations with a desired response to perform in response to the occurrence of the associated specific exceptional situation, the desired response comprising:

returning the nonstandard value as a result of the computation, wherein default values corresponding to the general exceptional situations would be returned for the general exceptional situations, the nonstandard value residing in a nonstandard value table comprising the plurality of specific exceptional situations and corresponding nonstandard values; and dynamically updating at least one nonstandard value to be returned and the desired response associated with the nonstandard value as a result of a computation during which an associated specific exceptional situation occurs.

3. The method of claim 2 wherein the desired response further comprises:

storing a directive indicating a step to perform in response to the occurrence of the associated specific exceptional situation in a storage area associated with the specific exceptional situation, the directive indicating a step other than returning a nonstandard value.

4. The method of claim 3 further comprising:

updating at least one directive associated with at least one specific exceptional situation, the directive indicating a step to perform in response to the occurrence of the associated specific exceptional situation.

5. A computer system for processing occurrences of exceptional situations during computations, the computer system comprising:

an exceptional situation ascertaining module, configured to ascertain an occurrence of a specific exceptional situation during a computation, the specific exceptional situation comprising a specific instance of a general exceptional situation, wherein a default value would be returned for the general exception situation;

a response determining module, configured to determine a desired response to an occurrence of the specific exceptional situation, the response determining module being communicatively coupled to the ascertaining module;

a result returning module, configured to return nonstandard values as results of computations in response to specific exceptional situations, the result returning module being communicatively coupled to the response determining module, the nonstandard values residing in a nonstandard value table comprising a plurality of specific exceptional situations and corresponding nonstandard values; and an updating module, configured to dynamically update a nonstandard value in the nonstandard value table and the desired response associated with the nonstandard value as a result of the computation during which an associated specific exceptional situation occurred, the updating module being communicatively coupled to the response determining module and to the result returning module.

6. The computer system of claim 5 further comprising:

a nonstandard action performing module, configured to perform a nonstandard action associated with the specific exceptional situation, the nonstandard action performing module being communicatively coupled to the response determining module, the nonstandard action comprising an action other than returning a nonstandard value.

7. A computer system for processing occurrences of exceptional situations during computations, the computer system comprising:

an association module, configured to associate each of a plurality of specific exceptional situations with a nonstandard value, each of the plurality of specific exceptional situations comprising specific instances of general exceptional situations, and to associate each of the plurality of specific exceptional situations with a desired response to perform in response to an occurrence of the associated specific exceptional situation;

a result returning module, configured to return nonstandard values as results of computations, the result returning module being communicatively coupled to the association module, wherein default values corresponding to the general exceptional situations would be returned for the general exceptional situations, the nonstandard values residing in a nonstandard value table comprising the plurality of specific exceptional situations and corresponding nonstandard values; and an updating module, configured to dynamically update nonstandard values to be returned and the desired responses associated with the nonstandard values as results of computations, the nonstandard value updating module being communicatively coupled to association module.

8. The computer system of claim 7 further comprising:

a nonstandard action performing module, configured to perform a nonstandard action associated with a specific exceptional situation, the nonstandard action performing module being communicatively coupled to the association module, the nonstandard action comprising an action other than returning a nonstandard value.

9. The computer system of claim 7 further comprising:

a directive storing module, configured to store a directive indicating a step to perform in response to an occurrence of an associated specific exceptional situation in a storage area associated with the specific exceptional situation, the directive storing module being communicatively coupled to the association module, the directive indicating a step other than the nonstandard action.

10. The computer system of claim 9 comprising:

a directive updating module, configured to update directives associated with specific exceptional situations, the directive updating module being communicatively coupled to the directive storing module.

11. A computer system for processing occurrences of exceptional situations during computations, the computer system comprising:

ascertaining means, for ascertaining an occurrence of a specific exceptional situation during a computation, the specific exceptional situation comprising a specific instance of a general exceptional situation;

determining means, for determining a desired response to the occurrence of the specific exceptional situation;

nonstandard value returning means, for returning, as a result of the computation, a nonstandard value associated with the specific exceptional situation, wherein a default value would be returned for the general exceptional situation, the nonstandard value residing in a nonstandard value table comprising a plurality of specific exceptional situations and corresponding nonstandard values; and updating means, for dynamically updating the nonstandard value in the nonstandard value table and the desired response associated with the nonstandard value as a result of the computation during which the specific exceptional situation occurred.

12. The computer system of claim 11 further comprising:
nonstandard action performing means, for performing a nonstandard action associated with the specific exceptional situation, the nonstandard action comprising an action other than returning a nonstandard value.

13. The computer system of claim 12 further comprising:
desired nonstandard action retrieving means, for retrieving the desired nonstandard action associated with the specific exceptional situation from a storage area associated with the specific exceptional situation.

14. A computer program product for processing occurrences of exceptional situations during computations, the computer program product comprising:
program code for ascertaining an occurrence of a specific exceptional situation during a computation, the specific exceptional situation comprising a specific instance of a general exceptional situation;
program code for determining a desired response to the occurrence of the specific exceptional situation;
program code for returning, as a result of the computation, a nonstandard value associated with the specific exceptional situation, wherein a default value would be returned for the general exceptional situation, the nonstandard value residing in a nonstandard value table comprising a plurality of specific exceptional situations and corresponding nonstandard values;
program code for dynamically updating the nonstandard value in the nonstandard value table and the desired response associated with the nonstandard value as a result of the computation during which the specific exceptional situation occurred; and
a computer readable medium on which the program codes are stored.

15. The computer program product of claim 14 further comprising:
program code for performing a nonstandard action associated with the specific exceptional situation, the nonstandard action comprising an action other than returning a nonstandard value.

16. The computer program product of claim 15 further comprising:
program code for retrieving the nonstandard action associated with the specific exceptional situation from a storage area associated with the specific exceptional situation.

17. A computer program product for processing occurrences of exceptional situations during computations, the computer program product comprising:
program code for associating each of a plurality of specific exceptional situations with a nonstandard value, each of the plurality of specific exceptional situations comprising specific instances of general exceptional situations, wherein default values corresponding to the general exceptional situations would be returned for the standard-defined exceptional situations;
program code for associating each of the plurality of specific exceptional situations with a desired response to perform in response to the occurrence of the associated specific exceptional situation, the desired response comprising:
returning the nonstandard value as a result of the computation, the nonstandard value residing in a nonstandard value table comprising the plurality of specific exceptional situations and corresponding nonstandard values;
program code for dynamically updating at least one nonstandard value to be returned and the desired response associated with the nonstandard value as a result of a computation during which an associated specific exceptional situation occurs; and
a computer readable medium on which the program codes are stored.

18. The computer program product of claim 17 further comprising:
program code for storing a directive indicating a step to perform in response to the occurrence of an associated specific exceptional situation in a storage area associated with the specific exceptional situation, the directive indicating a step other than returning a nonstandard value.

19. The computer program product of claim 18 further comprising:
program code for updating at least one directive associated with at least one specific exceptional situation, the directive indicating a step to perform in response to the occurrence of an associated specific exceptional situation.

* * * * *